C. A. KUNTZSCH.
LOCK NUT.
APPLICATION FILED DEC. 20, 1909.
973,673.
Patented Oct. 25, 1910.
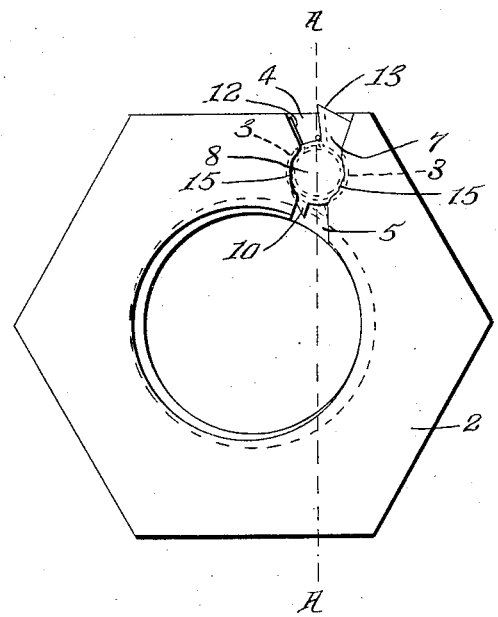
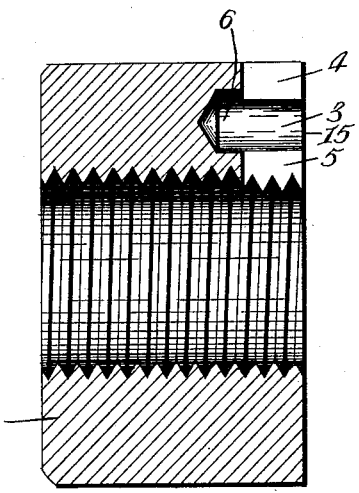
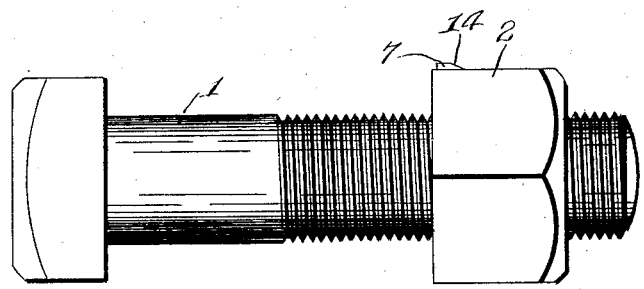
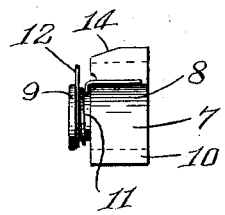
WITNESSES:
INVENTOR
Charles A. Kuntzsch
BY
Parsons Hall Bodell
ATTORNEYS

UNITED STATES PATENT OFFICE.

CHARLES A. KUNTZSCH, OF SYRACUSE, NEW YORK, ASSIGNOR OF ONE-THIRD TO DANIEL J. KUNTZSCH AND ONE-THIRD TO WILLIAM J. KUNTZSCH, BOTH OF SYRACUSE, NEW YORK.

LOCK-NUT.

973,673.      Specification of Letters Patent.      Patented Oct. 25, 1910.

Application filed December 20, 1909. Serial No. 534,047.

*To all whom it may concern:*

Be it known that I, CHARLES A. KUNTZSCH, of Syracuse, in the county of Onondaga and State of New York, have invented a certain new and useful Lock-Nut, of which the following is a specification.

My invention has for its object the production of a lock nut which is simple in construction and economical in manufacture, and it consists in the novel features of construction hereinafter set forth and claimed.

In describing this invention, reference is had to the accompanying drawing in which like characters designate corresponding parts in all the views.

Figure 1 is a face view of my lock nut. Fig. 2 is a section on line A—A, Fig. 1, the pawl being omitted. Fig. 3 is an elevation of a bolt with my lock nut thereon. Fig. 4 is an enlarged detail view of the pawl of my lock nut, and spring therefor.

1 is a bolt, 2 a nut screwing on the bolt, the nut being formed with a recess in one end thereof, the recess including a bearing portion disposed parallel to the axis of the nut and having opposite cylindrically curved walls 3, and the recess also including passages 4, 5 extending from the bearing portion in opposite directions, the passage 4 extending outwardly and opening through said end and the periphery of the nut, and the passage 5 extending inwardly and opening through said end and the inner threaded wall of the nut. These passages are of less depth in a direction axially of the nut than the bearing portion of the recess so that a socket 6 is provided at the inner end of the bearing portion.

7 is a pawl arranged in the recess and having a hub or cylindrical part 8 slidably fitting, and bearing on, the walls 3 of the recess, and a trunnion 9 extending into the socket 6, the pawl also having a tooth 10 extending inwardly through the passage 5 of the recess for engaging the thread of the bolt 1 and also an outward extension or tail located in the passage 4 of the recess. The trunnion 9 is provided with a circumferential groove 11 in which is coiled a spring 12, the ends of which bear respectively against the walls of the recess and the tail of the pawl, the spring acting to hold the pawl in its operative position, that is with the pawl tooth 10 engaged with the threads of the bolt to prevent retrograde turning of the nut. The outer end of the tail of the pawl is provided with end faces 13 and 14 beveled in two directions for permitting a wrench to be passed on the nut in a direction axially of the nut or to be passed sidewise on the nut. The wrench when being engaged with the nut in either of the ways referred to, acts on the one or the other of the beveled faces 13 and 14 and operates to move the pawl about its axis against the action of the spring 12 and thereby withdraw the tooth 10 of the pawl out of its locking position.

In manufacturing my lock nut the recess is bored in the nut and the pawls are formed or punched out end to end in a tape which is severed at the proper points to separate said pawls, and in assembling the nut and pawl the pawl is moved endwise into the recess of the nut, the spring having been first placed on the pawl. After the pawl has been placed in position in the recess, the portions of the nut contiguous to the outer end of the hub of the pawl are riveted or spread at 15 over the end of the hub, thus holding the pawl in position.

My lock-nut is particularly advantageous in that it can be cheaply manufactured, consists of a minimum number of parts which are easily made and assembled, and further in that it dispenses with pivot pins and the like.

What I claim is:—

1. A lock nut provided with a recess in one end thereof, the recess including a bearing portion having opposing cylindrically curved walls, an outwardly extending passage leading from the bearing portion and opening through the periphery of the nut, and an inwardly extending passage leading from the bearing portion and opening through the inner threaded wall of the nut, and a pawl having a cylindrical part fitted to the cylindrical walls of the recess, a tail extending through the outwardly extending passage of the recess, and a tooth extending through the inwardly extending passage thereof, the tail having a cam surface at its outer end, adapted to be engaged by a wrench in order to move the pawl on its pivot and unlock the nut, substantially as and for the purpose set forth.

2. A lock nut provided with a recess in one end thereof, the recess including a bearing portion having opposing cylindrically curved walls, an outwardly extending passage leading from the bearing portion and opening through the periphery of the nut, and an inwardly extending passage leading from the bearing portion and opening through the inner threaded wall of the nut, and a pawl having a cylindrical part fitted to the cylindrical walls of the recess, a tail extending through the outwardly extending passage of the recess and a tooth extending through the inwardly extending passage thereof, the tail having its end face inclined in two directions, substantially as and for the purpose specified.

3. A lock nut provided with a recess in one end thereof, the recess including a bearing portion having cylindrically curved walls, a pawl having an enlarged cylindrical part fitted to the cylindrical walls of the recess, and a spring coiled about the cylindrical part and having its ends bearing respectively against the walls of the recess and the pawl, substantially as and for the purpose set forth.

4. A lock nut provided with a recess in one end thereof, the recess including a bearing portion having opposing cylindrically curved walls, a pawl having a cylindrical part fitted to the cylindrical walls of the recess and formed with a circumferential groove, and a spring coiled about the cylindrical part and located in the groove and having its ends bearing respectively against the walls of the recess and the pawl, substantially as and for the purpose specified.

5. A lock nut provided with a recess in one end thereof, the recess including a bearing portion disposed parallel to the axis of the nut and having cylindrically curved walls, and a passage leading from the bearing portion and opening through said end and through the inner threaded wall of the nut, the passage being of less depth in a direction axially of the nut, than said bearing portion of the recess so that a socket is formed at the inner end of the bearing portion of the recess, a pawl having a cylindrical part fitted to the cylindrical walls of the recess and a trunnion extending into the socket, the pawl also having a tooth projecting through the inward extension of the recess, and a spring coiled about the trunnion and having its ends bearing respectively against the walls of the recess and the pawl, substantially as and for the purpose described.

6. A lock nut provided with a recess in one end thereof, the recess including a bearing portion disposed parallel to the axis of the nut and having cylindrically curved walls, an outwardly extending passage leading from the bearing portion and opening through said end and the periphery of the nut, and an inwardly extending passage leading from the bearing portion and opening through said end and the inner threaded wall of the nut, said passages being of less depth, in a direction axially of the nut, than the bearing portion, so that a socket is provided at the inner end of the recess, and a pawl having a cylindrical part fitted to the cylindrical walls of the recess and provided with a trunnion extending into the socket, a tail extending through the outwardly extending passage of the recess and a tooth extending through the inwardly extending passage thereof, substantially as and for the purpose set forth.

7. A lock nut provided with a recess in one end thereof, the recess including a bearing portion disposed parallel to the axis of the nut and having cylindrically curved walls, an outwardly extending passage leading from the bearing portion and opening through said end and the periphery of the nut, and an inwardly extending passage leading from the bearing portion and opening through said end and the inner threaded wall of the nut, said passage being of less depth, in a direction axially of the nut, than the bearing portion, so that a socket is provided at the inner end of the recess, a pawl having a cylindrical part fitted to the cylindrical walls of the recess and provided with a trunnion extending into the socket, a tail extending through the outwardly extending passage of the recess and a tooth extending through the inwardly extending passage thereof, and a spring coiled around the trunnion and having its ends bearing respectively on the walls of the recess and on the tail of the pawl, substantially as and for the purpose specified.

8. A lock nut provided with a recess in one end thereof, the recess including a bearing portion disposed parallel to the axis of the nut and having cylindrically curved walls, an outwardly extending passage leading from the bearing portion and opening through said end and the periphery of the nut, and an inwardly extending passage leading from the bearing portion and opening through said end and the inner threaded wall of the nut, said passages being of less depth, in a direction axially of the nut, than the bearing portion, so that a socket is provided at the inner end of the bearing portion, and a pawl having a cylindrical part fitted to the cylindrical walls of the recess and provided with a trunnion extending into the socket, the trunnion being formed with a circumferential groove, the pawl also having a tail and a tooth extending respectively through said passages, said pawl being movable into the recess by an axial movement of the pawl, and a spring coiled about the trunnion and located within the groove and having its ends bearing respectively on the walls of the recess and the tail of the pawl, the portion of the nut around the outer end of the cylindrical walls of the recess being spread over the contiguous part of the pawl for holding the pawl in position, substantially as and for the purpose described.

In testimony whereof, I have hereunto signed my name in the presence of two attesting witnesses, at Syracuse, in the county of Onondaga, in the State of New York, this 10th day of December, 1909.

CHARLES A. KUNTZSCH.

Witnesses:
S. DAVIS,
E. R. SEEMILLER.